United States Patent [19]

Alewelt et al.

[11] 4,127,561
[45] Nov. 28, 1978

[54] POLYCARBONATES AND A PROCESS FOR THEIR PREPARATION

[75] Inventors: Wolfgang Alewelt; Günter Jacobs; Dieter Margotte; Erich Lux, all of Krefeld, Germany

[73] Assignee: Bayer Aktiengesellschaft, Leverkusen, Germany

[21] Appl. No.: 881,974

[22] Filed: Feb. 27, 1978

[30] Foreign Application Priority Data

Mar. 15, 1977 [DE] Fed. Rep. of Germany ....... 2711184

[51] Int. Cl.² ............................................. C08G 63/62
[52] U.S. Cl. ..................................... 528/199; 528/196; 260/583 N; 260/563 C; 260/568; 260/583 J
[58] Field of Search ................................. 260/47 XA

[56] References Cited

U.S. PATENT DOCUMENTS

| | | | |
|---|---|---|---|
| 3,220,975 | 11/1965 | Fox | 260/47 XA |
| 3,275,601 | 9/1966 | Schnell et al. | 260/47 XA |
| 3,305,520 | 2/1967 | Fritz et al. | 260/45.7 P |
| 3,419,526 | 12/1968 | Schnell et al. | 260/47 XA |
| 3,787,359 | 1/1974 | Horn et al. | 260/47 XA |
| 3,794,629 | 2/1974 | Eimers et al. | 260/45.8 A |
| 3,875,112 | 4/1975 | Bockmann et al. | 260/47 XA |
| 4,038,252 | 7/1977 | Vernaleken et al. | 260/47 XA |
| 4,073,769 | 2/1978 | Eimers et al. | 260/45.8 R |

OTHER PUBLICATIONS

Encyclopedia of Chem. Technology, vol. 2, 1964, Kirk-Othmer, pp. 117 & 125.

*Primary Examiner*—Howard E. Schain
*Attorney, Agent, or Firm*—Gene Harsh; Lawrence S. Pope

[57] ABSTRACT

The present invention provides thermoplastic aromatic polycarbonates and a process for their production according to the phase boundary polycondensation process, characterized in that tertiary amines are employed as catalysts and are distilled beforehand over about 0.3–10% by weight, relative to the weight of the tertiary amine, of reducing agents and/or acid anhydrides with the exclusion of atmospheric oxygen.

14 Claims, No Drawings

1

POLYCARBONATES AND A PROCESS FOR THEIR PREPARATION

FIELD OF THE INVENTION

The present invention relates to polycarbonates which are prepared by the phase boundary process under catalysis by tertiary amines, tertiary amines which are distilled over reducing agents and/or acid anhydrides and with the exclusion of atmospheric oxygen being employed for the preparation.

The present invention also relates to a process for the preparation of polycarbonates by the phase boundary process under catalysis by tertiary amines, which is characterized in that tertiary amines which are distilled over reducing agents and/or acid anhydrides and with the exclusion of atmospheric oxygen are employed.

The polycarbonates according to the invention are particularly light in color and stable in color.

BACKGROUND OF THE INVENTION

Prior art polycarbonates while possessing many excellent properties do have the tendency of discoloring upon exposure to heat. Numerous other possibilities for compensating the discoloration of polycarbonates on exposure to heat already exist, namely, for example, by adding additives, in particular phosphites (compare German Patent Specifications Nos. 1,128,653; 2,104,207, and 2,255,639 and their respective United States equivalents: U.S. Pat. Nos. 3,305,520; 3,794,629 and U.S. Patent application No. 635,010, filed Nov. 25, 1975 and now indicated to be allowed), optionally in combination with glycerol (German Patent Specification No. 2,039,971) or epoxides (German Patent Specification No. 2,402,367) or oxetane compounds (German Patent Specification No. 2,510,463 and its U.S. equivalent, U.S. Patent application No. 659,385, filed Feb. 19, 1976.

In contrast to these methods for stabilizing the color of polycarbonates towards exposure to heat, the method according to the invention uses a completely different principle, in that the tertiary amines to be employed as catalysts in the phase boundary polycondensation reaction, which are used, in particular, for the purpose of the condensation of the oligocarbonates which are primarily formed during the polycarbonate preparation by the phase boundary process and contain chlorocarbonic acid ester terminal groups, are distilled beforehand over reducing agents and/or acid anhydrides, with the exclusion of atmospheric oxygen.

The particular advantage of this process is that polycarbonates with a higher light transmission can be prepared without adding stabilizers, and this advantageously manifests itself when used continuously at relatively high temperatures on the one hand, or when used in the food sector on the other hand.

SUMMARY OF THE INVENTION

According to the present invention, thermoplastic aromatic polycarbonates and a process for their production are provided according to the phase boundary polycondensation process, characterized in that tertiary amines are employed as catalysts and are distilled beforehand over about 0.3–10% by weight, relative to the weight of the tertiary amine, of reducing agents and/or acid anhydrides with the exclusion of atmospheric oxygen.

DETAILED DESCRIPTION OF THE INVENTION

The use of tertiary amines in the preparation of thermoplastic aromatic polycarbonates is known. (See German Patent Specification No. 1,046,311 and U.S. Pat. No. 3,275,601 incorporated herein by reference). Suitable tertiary amines are, in particular, aliphatic tertiary amines, such as triethylamine or tri-butyl-amine, cycloaliphatic tertiary amines, such as N,N-dimethyl-cyclohexylamine or N,N-diethyl-cyclohexylamine, and aromatic tertiary amines, such as N,N-dimethylaniline or N,N-diethylaniline. Tertiary aliphatic amines are particularly preferred.

Tertiary amines are prepared industrially by the alkylation of ammonia or by the reductive amination of aldehydes or ketones. According to experience, such industrial products still contain impurities ($\leq 1\%$, determined by gas chromatography), which manifest themselves in a troublesome manner when the products are employed as a catalyst for the preparation of a polycarbonate, by being co-condensed during the condensation by the phase boundary process and then causing discolorations on exposure to heat. It has now surprisingly been found, that by distilling the tertiary amines over reducing agents and/or acid anhydrides their quality is improved to such an extent that when used as catalysts in the polycarbonate preparation by the phase boundary process they surprisingly cause polycarbonates prepared in this manner to be particularly light in color and stable in color and to have an increased light transmission, even after prolonged storage at relatively high temperature.

The tertiary amines are distilled in a known manner and using known equipment. The tertiary amines are distilled out of a distillation flask over a short column, combined with distillation bridge and condenser under inert gas atmosphere into a suitable bottle under normal pressure or reduced pressure. By this distillation the tertiary amines are separated from the acid anhydrides and/or reducing agents previously added. The amount of acid anhydride employed can be varied within a wide range. In general, about 0.3–10, preferably about 0.5–5% by weight, relative to the weight of the tertiary amine to be purified, are optimal. In principle, all acid anhydrides can be employed, preferably those which are sufficiently reactive and can be easily separated off from the tertiary amine. Suitable acid anhydrides are those of carboxylic acids, preferably such having 4 to 14 carbon atoms, and are those of inorganic acids, preferably $P_2O_5$. For reasons of cost, those acid anhydrides which are industrially accessible in a pure form are preferred. Acetic anhydride, propionic anhydride, benzoic anhydride, phthalic anhydride and pyromellitic anhydride are particularly suitable.

The amount of reducing agent can vary within wide ranges; in general, about 0.3–10, preferably about 0.5–5, % by weight, relative to the weith of tertiary amine to be purified, are employed. Any desired compounds with reducing properties can be employed as reducing agents. Compounds with reducing properties are especially inorganic salts having reducing properties. Examples which are particulary suitable are complex metal hydrides, such as sodium borohydride and lithium borohydride, optionally in combination with Raney nickel. Furthermore, alkali metal sulphites and alkaline earth metal sulphites, bisulphites, thiosulphates and sulphides as well as hydrogen in the presence of hydrogenation catalysts can be employed.

In the case of the combined use of acid anhydride and reducing agent, in general a total of between about 0.3 and 10, preferably between about 0.5 and 5, % by weight, relative to the weight of tertiary amine to be purified, are employed.

For the purification, the tertiary amines must have a water content which is as low as possible, otherwise an increased consumption of acid anhydrides or of water-binding reducing agents must be expected. Thus, if appropriate, the amines must be dried by known processes. For the purification, a reducing agent and/or an acid anhydride is added to the tertiary amines and the mixture is heated under reflux with the exclusion of atmospheric oxygen. The purified amine is then distilled off.

The preparation of the polycarbonates by the phase boundary or interfacial polycondensation process is well known and described in such standard tests as *Chemistry and Physics of Polycarbonates*, Schnell, Interscience 1964. The polycarbonates are obtained by reacting diphenols, in particular dihydroxydiaryl-alkanes or -cycloalkanes, with phosgene, those dihydroxydiaryl-alkanes or -cycloalkanes with aryl radicals which are substituted in the o-position relative to the phenolic hydroxyl groups also being suitable, in addition to unsubstituted dihydroxydiaryl-alkanes or -cycloalkanes. The polycarbonates prepared by the process according to the invention can also be branched in a known manner. A number of such branched polycarbonates and their preparation is taught by U.S. Reissue Pat. No. 27,682, incorporated herein by reference.

The polycarbonates according to the invention have average molecular weights ($M_w$ = weight-average) between about 10,000 and 200,000, preferably between about 20,000 and 100,000, which can be determined from the relative viscosity of the polycarbonates (measured in $CH_2CL_2$ at 25° C. and at a concentration of 0.5% by weight).

Suitable diphenols are, for example, hydroquinone, resorcinol, 4,4'-dihydroxydiphenyl, bis-(hydroxyphenyl)-alkanes, such as, for example, $C_1$–$C_8$-alkylene- or $C_2$–$C_8$-alkylidene-bisphenols, bis-(hydroxyphenyl)-cycloalkanes, such as, for example, $C_5$–$C_6$-cycloalkylene- or $C_5$–$C_6$-cycloalkylidene-bisphenols and bis-(hydroxyphenyl) sulphides, ethers, ketones, sulphoxides or sulphones. Further examples are a,a'-bis-(hydroxyphenyl)-diisopropylbenzenes as well as the corresponding nuclear-alkylated or nuclear-halogenated compounds. Polycarbonates based on 2,2-bis-(4-hydroxyphenyl)-propane (bisphenol A), 2,2-bis-(4-hydroxy-3,5-dichloro-phenyl)-propane (tetrachlorobisphenol A), 2,2-bis-(4-hydroxy-3,5-dibromo-phenyl)-propane (tetrabromobisphenol A), 2,2-bis-(4-hydroxy-3,5-dimethyl-phenyl)-propane (tetramethylbisphenol A), 2,2-bis-(4-hydroxy-3-methyl-phenyl)-propane and 1,1-bis-(4-hydroxy-phenyl)-cyclohexane (bisphenol Z) as well as those based on trinuclear bisphenols, such as a,a'-bis-(4-hydroxy-phenyl)-p-diisopropylbenzene, are preferred.

Further diphenols suitable for the preparation of polycarbonates are described in U.S. Pat. Nos. 3,028,265, 2,999,835, 3,148,172, 3,271,368, 2,991,273, 3,271,367, 3,280,078, 3,014,891, 2,999,846, 3,879,348, 3,879,347 incorporated herein by reference and U.S. Patent applications Nos. 264,642 and 459,984 and German Patent Specifications Nos. 2,063,050, 2,063,052, 2,211,957 and 2,211,956.

The starting materials used in the examples which follow are characterized as follows (parts = parts by weight):

1. Purification of a tertiary amine 1 part of phthalic anhydride and 0.5 part of sodium borohydride are added to 100 parts of triethylamine. The reaction mixture is heated under reflux for 1 hour, with the exclusion of atmospheric oxygen. The purified triethylamine is then distilled off over a short column.

2. Preparation of a polycarbonate

About 456 parts of 2,2-bis-(4-hydroxyphenyl)-propane and 9.5 parts of p.-tert.-butylphenol are suspended in 1.5 l of water. The oxygen is removed from the reaction mixture in a 3-necked flask, fitted with a stirrer and gas inlet tube, by passing nitrogen through the reaction mixture for 15 minutes, while stirring. 355 parts of 45% strength sodium hydroxide solution and 1,000 parts of methylene chloride are then added. The mixture is cooled to 25° C. 237 parts of phosgene are added over a period of 120 minutes while maintaining this temperature by cooling. After 15 minutes and after 30 minutes after the absorption of phosgene has begun, additional amounts of 75 parts each of a 45% strength sodium hydroxide solution are added. 1.6 parts of amine (see Examples 1–8) are added to the solution formed and the mixture is stirred for a further 15 minutes. A highly viscous solution is obtained, the viscosity of which is controlled by adding methylene chloride. The aqueous phase is separated off.

The organic phase is washed with water until free from salts and alkali. The polycarbonate is isolated from the washed solution and dried. The polycarbonate has a relative viscosity of 1.30–1.31, measured in a 0.5% strength solution of methylene chloride at 25° C. This approximately corresponds to a molecular weight of 34,000. The polycarbonate thus obtained is extruded and granulated.

The following samples of tertiary amine were employed for the preparation of a polycarbonate (parts = parts by weight):

EXAMPLES

EXAMPLE 1 (comparison example)

Triethylamine without purification

EXAMPLE 2

100 parts of triethylamine purified with 1 part of phthalic anhydride and 0.5 part of sodium borohydride

EXAMPLE 3

100 parts of triethylamine purified with 3 parts of phthalic anhydride and 1.5 parts of sodium borohydride

EXAMPLE 4

100 parts of triethylamine purified with 3 parts of phthalic anhydride and 3 parts of sodium sulphite

EXAMPLE 5

100 parts of triethylamine purified with 1 part of maleic anhydride and 3 parts of sodium borohydride and 3 parts of Raney nickel.

EXAMPLE 6

100 parts of triethylamine purified with 3 parts of phthaic anhydride.

EXAMPLE 7

100 parts of dimethylcyclohexylamine purified with 1 part of phthalic anhydride and 0.5 part of sodium borohydride.

EXAMPLE 8

100 parts of triethylamine purified with 3 parts of sodium borohydride and 3 parts of Raney nickel.

Polycarbonates were prepared with the tertiary amines purified in the various manners and were processed to test pieces. The test pieces were heat-treated at 140° C. in a drying cabinet. The light transmission was measured according to DIN 5 033 and DIN 4 646 with the aid of a spectrophotometer. The decrease in the light transmission at 420 nm in the course of the heat treatment is a measure of the increasing discoloration of the test piece. (Compare corresponding measurement in US-PS No. 3794 629 col. 5, line 66 to col. 6, line 24).

Table

Light transmission of the polycarbonate test rods at 420 nm with a sheet thickness of 4 mm after heat treatment at 140° C.

| Polycarbonate with tertiary amine from Example | Heat treatment | | | |
|---|---|---|---|---|
| | 0 days | 6 days | 12 days | 21 days |
| 1 (Comparison) | 0.798 | 0.795 | 0.790 | 0.761 |
| 2 | 0.821 | 0.819 | 0.815 | 0.808 |
| 3 | 0.832 | 0.829 | 0.826 | 0.815 |
| 4 | 0.823 | 0.820 | 0.816 | 0.809 |
| 5 | 0.827 | 0.824 | 0.819 | 0.812 |
| 6 | 0.819 | 0.816 | 0.811 | 0.805 |
| 7 | 0.822 | 0.817 | 0.814 | 0.806 |
| 8 | 0.815 | 0.810 | 0.802 | 0.759 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of thermoplastic, aromatic polycarbonates according to the phase boundary polycondensation reaction using tertiary amines as catalysts, the improvement wherein the tertiary amines are distilled beforehand over reducing agents and/or acid anhydrides with the exclusion of atmospheric oxygen.

2. The process of claim 1, wherein the tertiary amines are selected from the group consisting of triethylamine, tri-butyl-amine, N,N-dimethyl-cyclohexylamine, N,N-diethyl-cyclohexylamine, N,N-dimethylaniline, and N,N-diethylaniline.

3. The process of claim 2, wherein the tertiary amines are triethylamine or tri-butyl-amine.

4. The process of claim 1, wherein the acid anhydrides are selected from the group consisting of acetic anhydride, propionic anhydride, benzoic anhydride, phthalic anhydride and pyromellitic anhydride.

5. The process of claim 1 wherein the reducing agent is selected from the group consisting of complex metal hydrides, alkali metal sulphites, alkali earth metal sulphites, bisulphites, thiosulphates, and sulphides and hydrogen.

6. The process according to claim 1, wherein the reducing agents and/or acid anhydrides are employed in amounts between about 0.3 and 10% by weight, relative to the weight of tertiary amine.

7. The process according to claim 1, wherein phthalic anhydride is employed.

8. The process according to claim 1, wherein the reducing agent is a mixture of sodium borohydride and Raney nickel.

9. The process according to claim 1, wherein the tertiary amine is dried to remove water therefrom before distillation.

10. The process of claim 1, wherein complex metal hydrides selected from the group consisting of sodium borohydride and lithium borohydride, optionally in combination with Raney nickel are used as reducing agents.

11. The process of claim 1, wherein acid anhydrides selected from the group consisting of acid anhydrides of carboxylic acids and acid anhydrides of inorganic acids are used.

12. The process of claim 11, wherein the acid anhydrides of carboxylic acids having 4 to 14 carbon atoms are used.

13. The process of claim 11, wherein $P_2O_5$ is the acid anhydride of an inorganic acid.

14. The process of claim 1, wherein inorganic salt reducing agents are used.

* * * * *